United States Patent
Nakahira

(10) Patent No.: US 11,983,369 B2
(45) Date of Patent: May 14, 2024

(54) CONDUCTIVE MEMBER FOR TOUCH PANEL, TOUCH PANEL, TOUCH PANEL DISPLAY DEVICE, AND METHOD OF PRODUCING CONDUCTIVE MEMBER FOR TOUCH PANEL

(71) Applicant: FUJIFILM Corporation, Tokyo (JP)

(72) Inventor: Shinichi Nakahira, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/347,302

(22) Filed: Jul. 5, 2023

(65) Prior Publication Data
US 2023/0341982 A1  Oct. 26, 2023

Related U.S. Application Data

(63) Continuation of application No. PCT/JP2021/045296, filed on Dec. 9, 2021.

(51) Int. Cl.
*G06F 3/044* (2006.01)

(52) U.S. Cl.
CPC .. *G06F 3/0445* (2019.05); *G06F 2203/04102* (2013.01); *G06F 2203/04103* (2013.01)

(58) Field of Classification Search
CPC . G06F 3/044–0448; G06F 2203/04102–04103
See application file for complete search history.

(56) References Cited

U.S. PATENT DOCUMENTS

| 2010/0110041 A1* | 5/2010 | Jang | G06F 3/0416 345/82 |
| 2012/0169628 A1* | 7/2012 | Kuo | G06F 3/0446 345/173 |

(Continued)

FOREIGN PATENT DOCUMENTS

| CN | 110794992 A | 2/2020 |
| JP | 2016-170264 A | 9/2016 |

(Continued)

OTHER PUBLICATIONS

International Search Report issued in PCT/JP2021/045296 on Mar. 8, 2022.

(Continued)

*Primary Examiner* — Hang Lin
(74) *Attorney, Agent, or Firm* — Edwards Neils LLC; Jean C. Edwards, Esq.

(57) ABSTRACT

A conductive member for a touch panel, a touch panel, and a touch panel display device that suppresses peeling of a connection terminal portion while using a flexible substrate. The conductive member includes a flexible substrate; a first conductive layer disposed on the flexible substrate; an insulating layer disposed on the first conductive layer; and a second conductive layer disposed on the insulating layer and on the first conductive layer. The first conductive layer has an anchor electrode portion. The second conductive layer has a first connection terminal portion covering the anchor electrode portion. Contour lines of a shape pattern of a portion of the anchor electrode portion covered with the first connection terminal portion are set such that a total value of lengths of components orthogonal to a predetermined direction is equal to or more than a total value of lengths of components parallel to the predetermined direction.

20 Claims, 11 Drawing Sheets

(56) References Cited

U.S. PATENT DOCUMENTS

| | | |
|---|---|---|
| 2013/0258614 A1 | 10/2013 | Misaki |
| 2013/0271675 A1 | 10/2013 | Misaki |
| 2014/0020944 A1 | 1/2014 | Misaki |
| 2016/0062520 A1* | 3/2016 | Choi .................. H10K 59/123 345/174 |
| 2016/0268524 A1 | 9/2016 | Suzuki et al. |
| 2017/0139511 A1 | 5/2017 | Ohsawa et al. |
| 2018/0348918 A1 | 12/2018 | Rhe et al. |

FOREIGN PATENT DOCUMENTS

| | | |
|---|---|---|
| JP | 2019-200804 A | 11/2019 |
| JP | 2020-009473 A | 1/2020 |
| WO | 2012/077320 A1 | 6/2012 |
| WO | 2012/090446 A1 | 7/2012 |
| WO | 2012/137710 A1 | 10/2012 |

OTHER PUBLICATIONS

Written Opinion issued in PCT/JP2021/045296 on Mar. 8, 2022.
International Preliminary Report on Patentability completed by WIPO on Jul. 31, 2023 in connection with International Patent Application No. PCT/JP2021/045296.

* cited by examiner

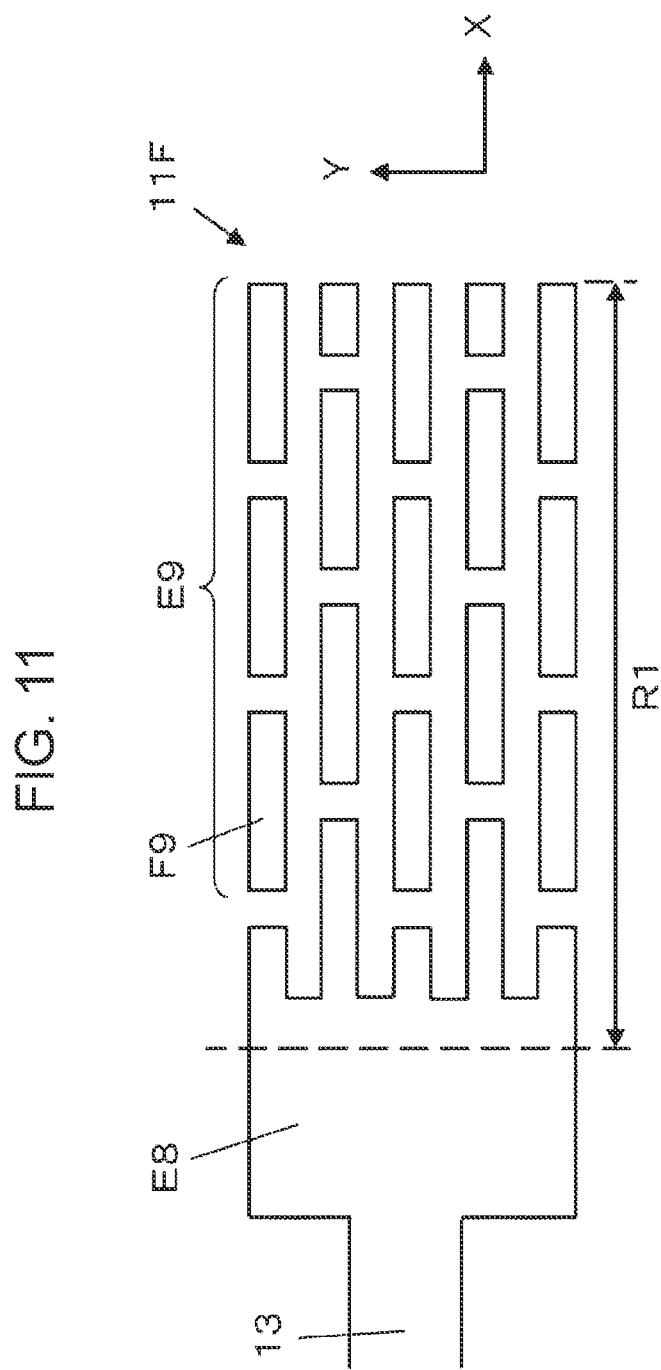

CONDUCTIVE MEMBER FOR TOUCH PANEL, TOUCH PANEL, TOUCH PANEL DISPLAY DEVICE, AND METHOD OF PRODUCING CONDUCTIVE MEMBER FOR TOUCH PANEL

CROSS-REFERENCE TO RELATED APPLICATIONS

This application is a Continuation of PCT International Application No. PCT/JP2021/045296 filed on Dec. 9, 2021, which was published under PCT Article 21(2) in Japanese, and which claims priority under 35 U.S.C. § 119(a) to Japanese Patent Application No. 2021-010604 filed on Jan. 26, 2021. The above applications are hereby expressly incorporated by reference, in their entirety, into the present application.

BACKGROUND OF THE INVENTION

1. Field of the Invention

The present invention relates to a conductive member for a touch panel, to be used as an electrode for detecting a touch operation.

The present invention also relates to a touch panel including the conductive member for a touch panel.

The present invention further relates to a touch panel display device including the touch panel.

The present invention further relates to a method of producing the conductive member for a touch panel.

2. Description of the Related Art

Conventionally, in various electronic devices including portable information devices such as tablet computers and smartphones, touch panel display devices have been used in which an input operation to the electronic device can be performed by a so-called touch operation of bringing a finger, a stylus pen, or the like, into contact with or close to a screen.

Such a touch panel display device has a conductive member in which a detector for detecting a touch operation is formed.

The detector may be formed of a transparent conductive oxide such as indium tin oxide (ITO), but may be formed of an opaque conductive material such as a metal other than the transparent conductive oxide. The opaque conductive material such as a metal has advantages such as easy patterning, excellent bendability, and lower resistance as compared to the above-described transparent conductive oxide.

For example, CN110794992A describes a conductive member in which a first electrode layer is laminated on one surface of a substrate consisting of glass, an insulating layer is laminated on the first electrode layer, and a second electrode layer is laminated on the insulating layer. The first electrode layer has a detection electrode portion for detecting a touch operation, lead wiring led out from the detection electrode portion, and an anchor electrode portion connected to the lead wiring and electrically connected to an external electric circuit. The anchor electrode portion has one end portion connected to the lead wiring and the other end portion exposed from the insulating layer for electrical connection to the external electric circuit, and a conductive connection terminal portion is disposed on the anchor electrode portion. Thus, the anchor electrode portion is prevented from being damaged in the producing process.

SUMMARY OF THE INVENTION

Although the glass substrate is used in CA110794992A, it may be desired to use a flexible substrate formed of a resin or the like instead of the glass substrate in order to enhance convenience of the conductive member. However, when the flexible substrate is used, there is a problem that the connection terminal portion is likely to be peeled off from the anchor electrode portion due to a stress acting on the interface between the anchor electrode portion and the connection terminal portion when the flexible substrate is bent.

The present invention is made to solve such a conventional problem, and an object of the present invention is to provide a conductive member for a touch panel capable of suppressing peeling of a connection terminal portion while using a flexible substrate.

Another object of the present invention is to provide a touch panel including the conductive member for a touch panel.

Still another object of the present invention is to provide a touch panel display device including the touch panel.

Yet another object of the present invention is to provide a method of producing the conductive member for a touch panel.

A conductive member for a touch panel according to a first invention includes a flexible substrate; a first conductive layer disposed on one surface of the flexible substrate; an insulating layer disposed on the first conductive layer; and a second conductive layer disposed on the insulating layer and on the first conductive layer. In plan view, the flexible substrate has a visual recognition region, a peripheral wiring region located on an outer side of the visual recognition region, and a connection wiring region located on an outer side of the peripheral wiring region in a predetermined direction. The first conductive layer has a first detection electrode portion disposed in the visual recognition region, a first lead wiring portion disposed in the peripheral wiring region and electrically connected to the first detection electrode portion, and an anchor electrode portion disposed in the connection wiring region and electrically connected to the first lead wiring portion. The second conductive layer has a second detection electrode portion disposed in the visual recognition region, a second lead wiring portion disposed in the peripheral wiring region and electrically connected to the second detection electrode portion, a second connection terminal portion disposed in the connection wiring region and electrically connected to the second lead wiring portion, and a first connection terminal portion disposed in the connection wiring region, electrically insulated from the second lead wiring portion, covering the anchor electrode portion, and electrically connected to the anchor electrode portion. In plan view, the anchor electrode portion forms a shape pattern in which the surface of the flexible substrate is partially exposed, and has an exposed region having at least a part not covered with the insulating layer. The first connection terminal portion covers the anchor electrode portion and is electrically connected to the anchor electrode portion in the exposed region. Contour lines of the shape pattern of a portion of the anchor electrode portion covered with the first connection terminal portion are set such that a total value Y1 of lengths of components orthogonal to the predetermined direction is equal to or more than a total value X1 of lengths of components parallel to the predetermined direction.

A conductive member for a touch panel according to a second invention includes a flexible substrate; a first conductive layer disposed on one surface of the flexible substrate; an insulating layer disposed on the first conductive layer; and a second conductive layer disposed on the insulating layer and on the first conductive layer. In plan view, the flexible substrate has a visual recognition region, a peripheral wiring region located on an outer side of the visual recognition region, and a connection wiring region located on an outer side of the peripheral wiring region in a predetermined direction. The first conductive layer has a first detection electrode portion disposed in the visual recognition region, a first lead wiring portion disposed in the peripheral wiring region and electrically connected to the first detection electrode portion, and an anchor electrode portion disposed in the connection wiring region and having at least a part electrically connected to the first lead wiring portion. The second conductive layer has a second detection electrode portion disposed in the visual recognition region, a second lead wiring portion disposed in the peripheral wiring region and electrically connected to the second detection electrode portion, a second connection terminal portion disposed in the connection wiring region and electrically connected to the second lead wiring portion, and a first connection terminal portion disposed in the connection wiring region, electrically insulated from the second lead wiring portion, covering the anchor electrode portion, and electrically connected to the anchor electrode portion. The anchor electrode portion includes a connection anchor portion connected to the first lead wiring portion and an independent anchor portion disposed at an interval from the connection anchor portion in the predetermined direction, and has an exposed region in which at least a part of the connection anchor portion and the independent anchor portion are not covered with the insulating layer. The first connection terminal portion covers the anchor electrode portion and is electrically connected to the anchor electrode portion in the exposed region.

The independent anchor portion can have a plurality of unit anchor portions disposed at an interval.

In plan view, a ratio of an area of the anchor electrode portion in the exposed region to an area of the first connection terminal portion in the exposed region is preferably 50% or less.

The first conductive layer and the second conductive layer can be formed of a same metal material.

A touch panel according to the present invention includes the above-described conductive member for a touch panel; a circuit board electrically connected to the first connection terminal portion and the second connection terminal portion; and a cover member disposed on the second conductive layer via a pressure sensitive adhesive.

A touch panel display device according to the present invention includes the above-described touch panel; and a display module including a display surface, the display surface being bonded onto another surface of the flexible substrate via a pressure sensitive adhesive.

The circuit board may have one end to which the first connection terminal portion and the second connection terminal portion are connected, and another end folded back so as to face a surface of the display module on a side opposite to the display surface.

The connection wiring region may have an end portion folded back so as to face a surface of the display module on a side opposite to the display surface.

A method of producing the conductive member for a touch panel according to the first invention includes a first step of forming a first conductive layer on one surface of a flexible substrate; a second step of forming an insulating layer on the first conductive layer; and a third step of forming a second conductive layer on the insulating layer and on the first conductive layer. In plan view, the flexible substrate has a visual recognition region, a peripheral wiring region located on an outer side of the visual recognition region, and a connection wiring region located on an outer side of the peripheral wiring region in a predetermined direction. The first conductive layer has a first detection electrode portion disposed in the visual recognition region, a first lead wiring portion disposed in the peripheral wiring region and electrically connected to the first detection electrode portion, and an anchor electrode portion disposed in the connection wiring region and electrically connected to the first lead wiring portion. The second conductive layer has a second detection electrode portion disposed in the visual recognition region, a second lead wiring portion disposed in the peripheral wiring region and electrically connected to the second detection electrode portion, a second connection terminal portion disposed in the connection wiring region and electrically connected to the second lead wiring portion, and a first connection terminal portion disposed in the connection wiring region, electrically insulated from the second lead wiring portion, covering the anchor electrode portion, and electrically connected to the anchor electrode portion. In plan view, the anchor electrode portion forms a shape pattern in which the surface of the flexible substrate is partially exposed, and has an exposed region having at least a part not covered with the insulating layer. The first connection terminal portion covers the anchor electrode portion and is electrically connected to the anchor electrode portion in the exposed region. Contour lines of the shape pattern of a portion of the anchor electrode portion covered with the first connection terminal portion are set such that a total value Y1 of lengths of components orthogonal to the predetermined direction is equal to or more than a total value X1 of lengths of components parallel to the predetermined direction.

A method of producing the conductive member for a touch panel according to the second invention includes a first step of forming a first conductive layer on one surface of a flexible substrate; a second step of forming an insulating layer on the first conductive layer; and a third step of forming a second conductive layer on the insulating layer and on the first conductive layer. In plan view, the flexible substrate has a visual recognition region, a peripheral wiring region located on an outer side of the visual recognition region, and a connection wiring region located on an outer side of the peripheral wiring region in a predetermined direction. The first conductive layer has a first detection electrode portion disposed in the visual recognition region, a first lead wiring portion disposed in the peripheral wiring region and electrically connected to the first detection electrode portion, and an anchor electrode portion disposed in the connection wiring region and having at least a part electrically connected to the first lead wiring portion. The second conductive layer has a second detection electrode portion disposed in the visual recognition region, a second lead wiring portion disposed in the peripheral wiring region and electrically connected to the second detection electrode portion, a second connection terminal portion disposed in the connection wiring region and electrically connected to the second lead wiring portion, and a first connection terminal portion disposed in the connection wiring region, electrically insulated from the second lead wiring portion, covering the anchor electrode portion, and electrically connected to the anchor electrode portion. The anchor electrode portion includes a connection anchor portion connected to the first lead wiring portion and an independent anchor portion disposed at an interval from the connection anchor portion in the predetermined direction, and has an exposed region in which at least a part of the connection anchor portion and the independent anchor portion are not covered with the insulating layer. The first connection terminal portion covers the anchor electrode portion and is electrically connected to the anchor electrode portion in the exposed region.

According to the present invention, peeling of the connection terminal portion can be suppressed while the flexible substrate is used.

BRIEF DESCRIPTION OF THE DRAWINGS

FIG. 11 is a view illustrating a third modification of the anchor electrode portion according to Embodiment 2.

DESCRIPTION OF THE PREFERRED EMBODIMENTS

Hereinafter, a conductive member for a touch panel and a touch panel according to the present invention will be described in detail based on preferred embodiments illustrated in the accompanying drawings.

In the following description, the expression "to" indicating a numerical range includes numerical values written on both sides of "to". For example, "s is a numerical value t1 to a numerical value t2" means that the range of s is a range including the numerical value t1 and the numerical value t2, and is t1≤s≤t2 in mathematical symbols.

Angles including "orthogonal", "parallel", and the like, include error ranges generally accepted in the technical field unless otherwise specified.

"Transparent" means that the transmittance is at least 40% or more, preferably 75% or more, more preferably 80% or more, and further preferably 90% or more in the visible light wavelength range of wavelengths 400 nm to 800 nm. The transmittance is measured by using "Plastics-Determination of total luminous transmittance and reflectance-" prescribed in JIS K 7375:2008.

Embodiment 1

Figure 1:
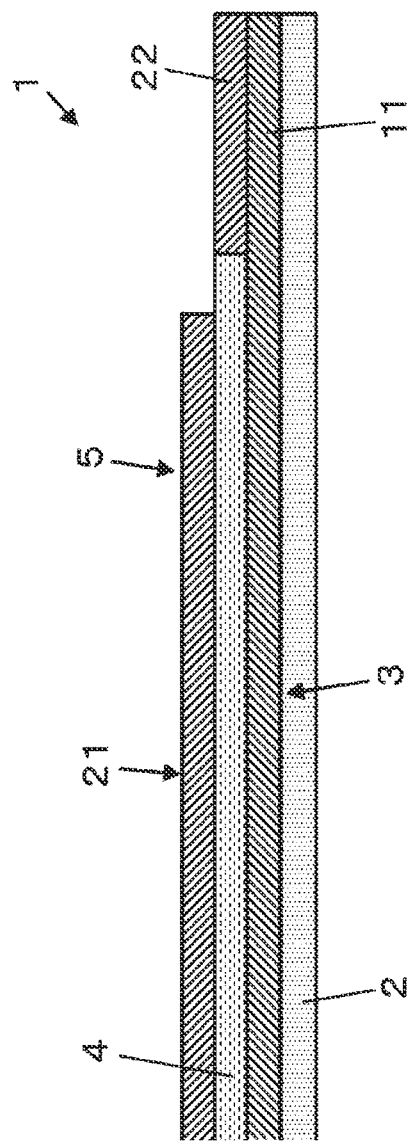
FIG. 1 is a partial cross-sectional view of a conductive member for a touch panel according to Embodiment 1 of the present invention.

FIG. 1 illustrates a configuration of a conductive member 1 for a touch panel according to Embodiment 1 of the present invention.

The conductive member 1 for a touch panel includes a flexible substrate 2, a first conductive layer 3 disposed on one surface of the flexible substrate 2, an insulating layer 4 disposed on the first conductive layer 3, and a second conductive layer 5 disposed on the insulating layer 4 and on the first conductive layer 3. An anchor electrode portion 11 exposed from the insulating layer 4 is formed at an end portion of the first conductive layer 3. The second conductive layer 5 has a second conductive layer main body 21 laminated on the insulating layer 4, and a first connection terminal portion 22 laminated on the anchor electrode portion 11 exposed from the insulating layer 4. The second conductive layer main body 21 and the first connection terminal portion 22 are disposed at an interval and are electrically insulated from each other.

The first conductive layer 3 is preferably in direct contact with the one surface of the flexible substrate 2, the insulating layer 4 is preferably in direct contact with the first conductive layer 3, and the second conductive layer 5 is preferably in direct contact with the first conductive layer 3 and the insulating layer 4. The second conductive layer main body 21 is preferably in direct contact with the insulating layer 4, and the first connection terminal portion 22 is preferably in direct contact with the anchor electrode portion 11.

A cover member (not illustrated) is bonded to a surface of the conductive member 1 for a touch panel on a second-conductive-layer-5 side, a display module (not illustrated) is bonded to a surface of the conductive member 1 for a touch panel on a flexible-substrate-2 side, and thus the conductive member 1 for a touch panel can be used as a touch panel display device. At this time, a user's finger, a stylus pen, or the like, in contact with or close to the cover member is detected, and hence a touch operation by the user is detected.

Figure 2:
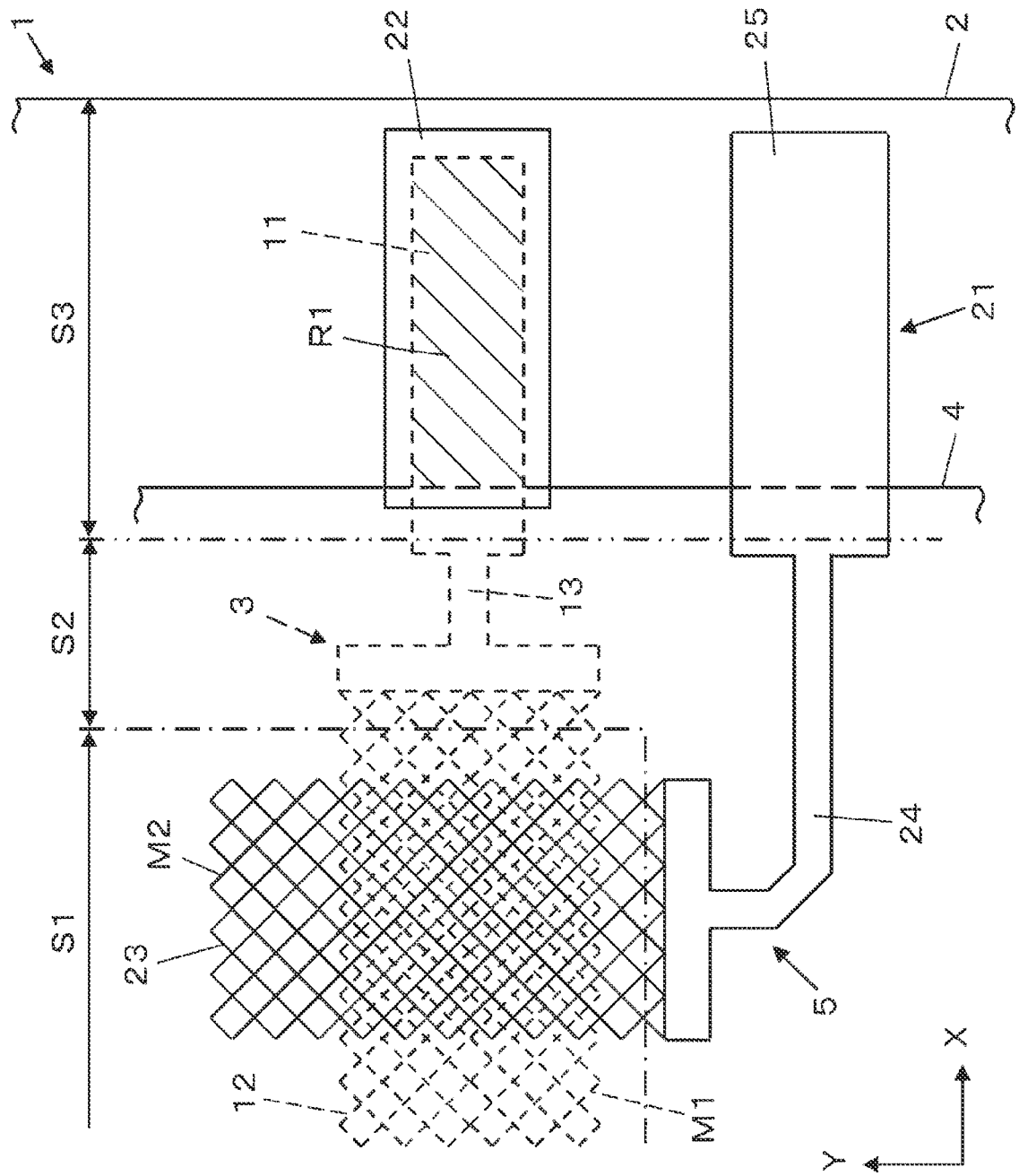
FIG. 2 is a plan view illustrating a part of the conductive member for a touch panel according to Embodiment 1.

FIG. 2 is a plan view illustrating a part of the conductive member 1 for a touch panel.

In plan view, the flexible substrate 2 has a visual recognition region S1 that is visually recognized by the user and is for detecting a touch operation with a finger, a stylus pen, and the like, a peripheral wiring region S2 located on an outer side of the visual recognition region S1, and a connection wiring region S3 located on an outer side of the peripheral wiring region S2 in a predetermined direction (also referred to as a first direction). Here, the predetermined direction is a direction in which a circuit board (not illustrated) is connected to the conductive member 1 for a touch panel, the predetermined direction is an X direction, and a direction orthogonal to the predetermined direction (also referred to as a second direction) is a Y direction.

The first conductive layer 3 disposed on the flexible substrate 2 has a first detection electrode portion 12 extending along the X direction for detecting a touch operation, a first lead wiring portion 13 electrically connected to the first detection electrode portion 12, and the anchor electrode portion 11 electrically connected to the first lead wiring portion 13.

The first detection electrode portion 12 consists of a plurality of first thin metal wires M1 intersecting each other in a mesh pattern, and is disposed in the visual recognition region S1. Also, the first lead wiring portion 13 is disposed in the peripheral wiring region S2, and the anchor electrode portion 11 is disposed in the connection wiring region S3. Further, the first detection electrode portion 12 and the first lead wiring portion 13 are covered with the insulating layer 4, but the anchor electrode portion 11 has an exposed region R1 having at least a part not covered with the insulating layer 4. In FIG. 2, the exposed region R1 is indicated by a hatched portion.

Of the first conductive layer 3 and the second conductive layer 5, the second conductive layer 5 disposed at a position relatively distant from the flexible substrate 2 has the second conductive layer main body 21 disposed on the insulating layer 4, and the first connection terminal portion 22 separated from the second conductive layer main body 21 and disposed so as to cover an area around the anchor electrode portion 11. The exposed region R1 of the anchor electrode portion 11 is covered with the first connection terminal portion 22 and electrically connected to the first connection terminal portion 22.

The second conductive layer main body 21 has a second detection electrode portion 23 extending along the Y direction for detecting a touch operation, a second lead wiring portion 24 electrically connected to the second detection electrode portion 23, and a second connection terminal portion 25 electrically connected to the second lead wiring portion 24.

The second detection electrode portion 23 consists of a plurality of second thin metal wires M2 intersecting each other in a mesh pattern, and is disposed in the visual recognition region S1. Also, the second lead wiring portion 24 is disposed in the peripheral wiring region S2, and the second connection terminal portion 25 is disposed in the connection wiring region S3.

Although not illustrated in FIG. 2, the first conductive layer 3 has a plurality of first detection electrode portions 12 extending along the X direction and arranged in the Y direction, a plurality of first lead wiring portions 13 electrically connected to the plurality of first detection electrode portions 12, and a plurality of anchor electrode portions 11 electrically connected to the plurality of first lead wiring portions 13. Similarly, the second conductive layer 5 has a plurality of second detection electrode portions 23 extending along the Y direction and arranged in the X direction, a plurality of second lead wiring portions 24 electrically connected to the plurality of second detection electrode portions 23, and a plurality of second connection terminal portions 25 electrically connected to the plurality of second lead wiring portions 24.

Also, the plurality of anchor electrode portions 11 of the first conductive layer 3 and the plurality of second connection terminal portions 25 of the second conductive layer 5 are disposed in the connection wiring region S3 in a state being arranged in the Y direction.

It is described that the first detection electrode portion 12 extends along the X direction in which the anchor electrode portion 11 extends, and the second detection electrode portion 23 extends along the Y direction orthogonal to the X direction in which the anchor electrode portion 11 extends. However, as long as the first detection electrode portion 12 and the second detection electrode portion 23 intersect each other, the direction in which the first detection electrode portion 12 extends is not limited to the X direction, and the direction in which the second detection electrode portion 23 extends is not limited to the Y direction.

Figure 3:
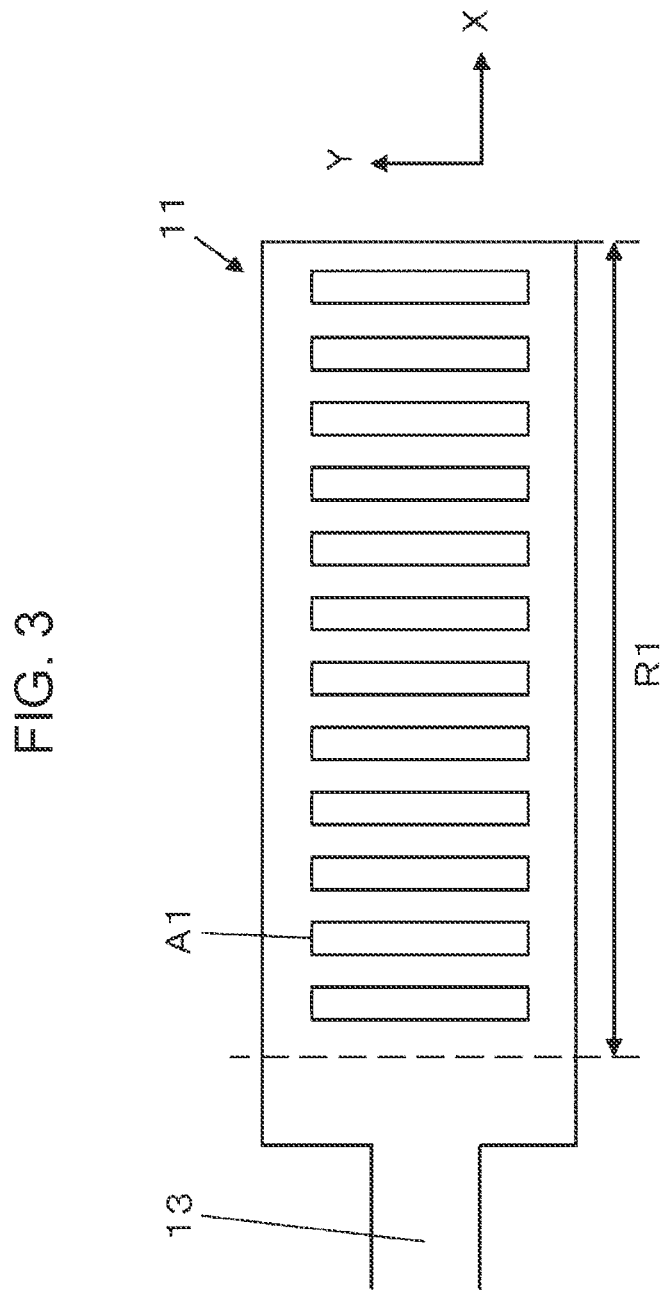
FIG. 3 is a view illustrating an anchor electrode portion according to Embodiment 1.

FIG. 3 is a plan view of the anchor electrode portion 11.

In plan view, the anchor electrode portion 11 has a rectangular outer shape having a long side along the X direction and a short side along the Y direction, and is formed such that a plurality of rectangular opening portions A1 each having a long side along the Y direction and a short side along the X direction are arranged at an interval in the X direction. The plurality of opening portions A1 are disposed in the exposed region R1 of the anchor electrode portion 11. That is, the anchor electrode portion 11 forms a shape pattern in which the surface of the flexible substrate 2 in the underlayer is partially exposed through the plurality of opening portions A1. Due to the presence of the plurality of rectangular opening portions A1, contour lines of the anchor electrode portion 11, that is, edge portions of the rectangular outer shape of the anchor electrode portion 11 and edge portions of the plurality of opening portions A1 are set such that a total value Y1 of lengths of components parallel to the Y direction is equal to or more than a total value X1 of lengths of components parallel to the X direction.

It is described that the contour lines of the anchor electrode portion 11 extend along the predetermined direction, that is, the X direction, or the direction orthogonal to the predetermined direction, that is, the Y direction. However, the contour lines may extend along a direction intersecting the X direction and the Y direction. In this case, the length of the component parallel to the X direction of the contour line and the length of the component parallel to the Y direction of the contour line can be calculated using relationships as follows, assuming that $\theta$ is an angle defined by the direction of the tangent to the contour line and the X direction:

(length of component parallel to X direction of contour line)=(length of contour line)×$\cos\theta$ (1); and (length of component parallel to Y direction of contour line)=(length of contour line)×$\sin\theta$ (2), (when $0° \leq \theta \leq 90°$), where $\cos\theta$ is a cosine function of the angle $\theta$ and $\sin\theta$ is a sine function of the angle $\theta$.

The total value X1 of the lengths of the components parallel to the X direction of the contour lines of the anchor electrode portion 11 is obtained as the sum of the values obtained by calculating the lengths of the components parallel to the X direction of the contour lines calculated using Expression (1) over all the contour lines of the anchor electrode portion 11. Also, the total value Y1 of the lengths of the components parallel to the Y direction of the contour lines of the anchor electrode portion 11 is obtained as the sum of the values obtained by calculating the lengths of the components parallel to the Y direction of the contour lines calculated using Expression (2) over all the contour lines of the anchor electrode portion 11.

It is described that the plurality of opening portions A1 are formed as illustrated in FIG. 3 as the shape of the anchor electrode portion 11. However, the shape of the anchor electrode portion 11 is not limited to that illustrated in FIG. 3 as long as the anchor electrode portion 11 is formed in a pattern in which the total value Y1 of the lengths of the components parallel to the Y direction of the contour lines of the anchor electrode portion 11 is equal to or more than the total value X1 of the lengths of the components parallel to the X direction of the contour lines of the anchor electrode portion 11.

Here, as illustrated in FIG. 2, the first connection terminal portion 22 and the second connection terminal portion 25 disposed in the connection wiring region S3 are connected to, for example, a flexible circuit board (not illustrated), and are electrically connected to an external electric circuit via the flexible circuit board. At this time, the flexible circuit board is disposed so as to protrude from the flexible substrate 2 in the X direction. For example, when the flexible circuit board is folded back for connection to the external electric circuit, a stress in the X direction and a stress in the Z direction orthogonal to the XY plane are generated in the first connection terminal portion 22.

Such stresses may cause occurrence of peeling between the first connection terminal portion 22 and the anchor electrode portion 11. However, since the total value Y1 of the lengths of the components parallel to the Y direction of the contour lines of the anchor electrode portion 11 is equal to or more than the total value X1 of the lengths of the components parallel to the X direction of the contour lines of the anchor electrode portion 11, it is possible to resist the stress in the X direction of the first connection terminal portion 22. Accordingly, peeling between the first connection terminal portion 22 and the anchor electrode portion 11 is suppressed.

As described above, with the conductive member 1 for a touch panel according to Embodiment 1 of the present invention, in plan view, the anchor electrode portion 11 is formed in such a pattern in which the total value Y1 of the lengths of the components parallel to the Y direction of the contour lines of the anchor electrode portion 11 is equal to or more than the total value X1 of the lengths of the components parallel to the X direction of the edge portions of the anchor electrode portion 11. Accordingly, peeling between the first connection terminal portion 22 and the anchor electrode portion 11 can be suppressed.

Figure 7:
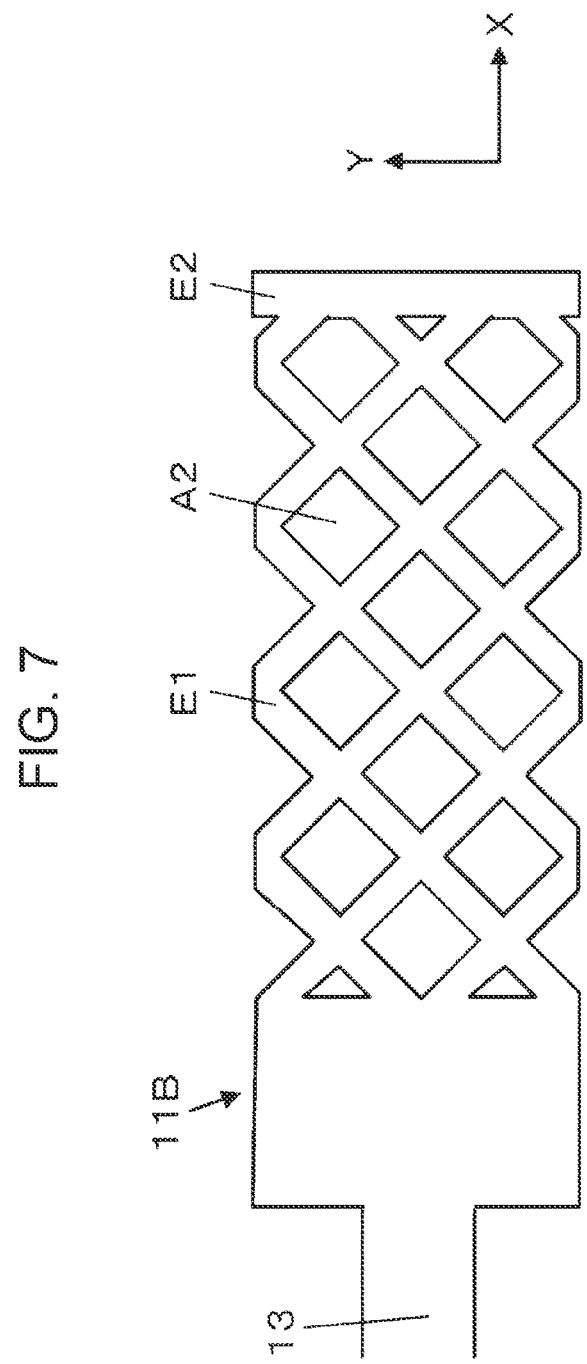
FIG. 7 is a view illustrating a modification of the anchor electrode portion according to Embodiment 1.

As illustrated in FIG. 7, an anchor electrode portion 11B may be formed in such a pattern having a mesh-shaped portion E1 in which a plurality of opening portions A2 arranged in two directions orthogonal to each other are formed and a rectangular portion E2 having a long side along the Y direction and a short side along the X direction. The anchor electrode portion 11B forms a shape pattern in which the surface of the flexible substrate 2 in the underlayer is partially exposed through the plurality of opening portions A2. Even when the anchor electrode portion 11B is formed in the pattern illustrated in FIG. 7, the total value Y1 of the lengths of the components parallel to the Y direction of the contour lines of the anchor electrode portion 11B is equal to or more than the total value X1 of the lengths of the components parallel to the X direction of the contour lines of the anchor electrode portion 11B. It is possible to resist a stress acting on the interface between the first connection terminal portion 22 and the anchor electrode portion 11B. Accordingly, peeling between the first connection terminal portion 22 and the anchor electrode portion 11B is suppressed.

In plan view, the ratio of the area of the anchor electrode portion 11 in the exposed region R1 to the area of the first connection terminal portion 22 in the exposed region R1 is preferably 50% or less. By designing the ratio of the area to be within this range, the stress acting on the first connection terminal portion 22 and the anchor electrode portion 11 can be further relaxed, adhesiveness between the first connection terminal portion 22 and the flexible substrate 2 can be enhanced, and peeling between the first connection terminal portion 22 and the anchor electrode portion 11B can be further suppressed.

The ratio of the area of the anchor electrode portion 11 in the exposed region R1 to the area of the first connection terminal portion 22 in the exposed region R1 is more preferably 45% or less, and most preferably 40% or less. The ratio of the area of the anchor electrode portion 11 in the exposed region R1 to the area of the first connection terminal portion 22 in the exposed region R1 is preferably 10% or more, and further preferably 20% or less.

Figure 4:
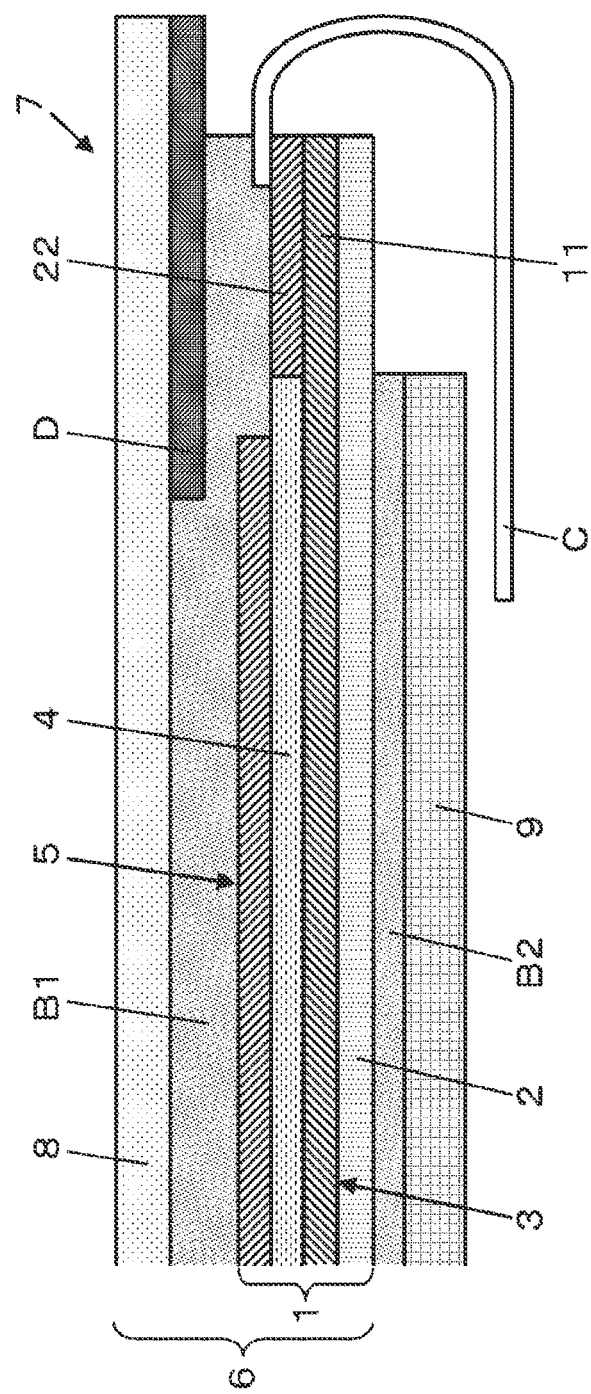
FIG. 4 is a partial cross-sectional view of a touch panel display device according to Embodiment 1.

Here, as illustrated in FIG. 4, a transparent cover member 8 is bonded onto the second conductive layer 5 of the conductive member 1 for a touch panel of Embodiment 1 with a transparent pressure sensitive adhesive B1, and thus a touch panel 6 can be constituted. The cover member 8 protects the conductive member 1 for a touch panel and forms a touch surface on which a touch operation is performed with a user's finger, a stylus pen, and the like.

Also, in the peripheral wiring region S2 and the connection wiring region S3 illustrated in FIG. 2, a decorative print portion D is formed on a surface of the cover member 8 on a conductive-member-1-for-a-touch-panel side. The decorative print portion D is opaque and serves to cover and hide the first detection electrode portion 12, the first lead wiring portion 13, and the anchor electrode portion 11 of the first conductive layer 3, and the second detection electrode portion 23, the second lead wiring portion 24, the first connection terminal portion 22, and the second connection terminal portion 25 of the second conductive layer 5.

Further, one end of a flexible circuit board C electrically connected to an external electric circuit (not illustrated) is connected to a surface of the first connection terminal portion 22 on a cover-member-8 side. Although not illustrated, similarly, the one end of the flexible circuit board C is connected to the second connection terminal portion 25 of the second conductive layer 5.

Further, in the touch panel 6, a display module 9 for displaying an image is bonded to a surface of the flexible substrate 2 on a side opposite to the first conductive layer 3 with a transparent pressure sensitive adhesive B2, and thus a touch panel display device 7 can be constituted. Although not illustrated in detail, the display module 9 includes a display screen such as a liquid crystal display, a controller for controlling display and the like of an image on the display screen, and the like. A user of the touch panel display device 7 visually recognizes an image displayed on the display module 9 through the touch panel 6, and performs a touch operation via the touch panel 6 based on the visually recognized image.

In the touch panel display device 7, for example, the other end of the flexible circuit board C is folded back with respect to the one end connected to the first connection terminal portion 22 and the second connection terminal portion 25 such that the other end faces a surface of the display module 9 on a side opposite to the display surface.

Since the touch panel display device 7 includes the conductive member 1 for a touch panel according to Embodiment 1 of the present invention, the risk of failure due to peeling between the first connection terminal portion 22 and the anchor electrode portion 11 can be suppressed.

Figure 6:
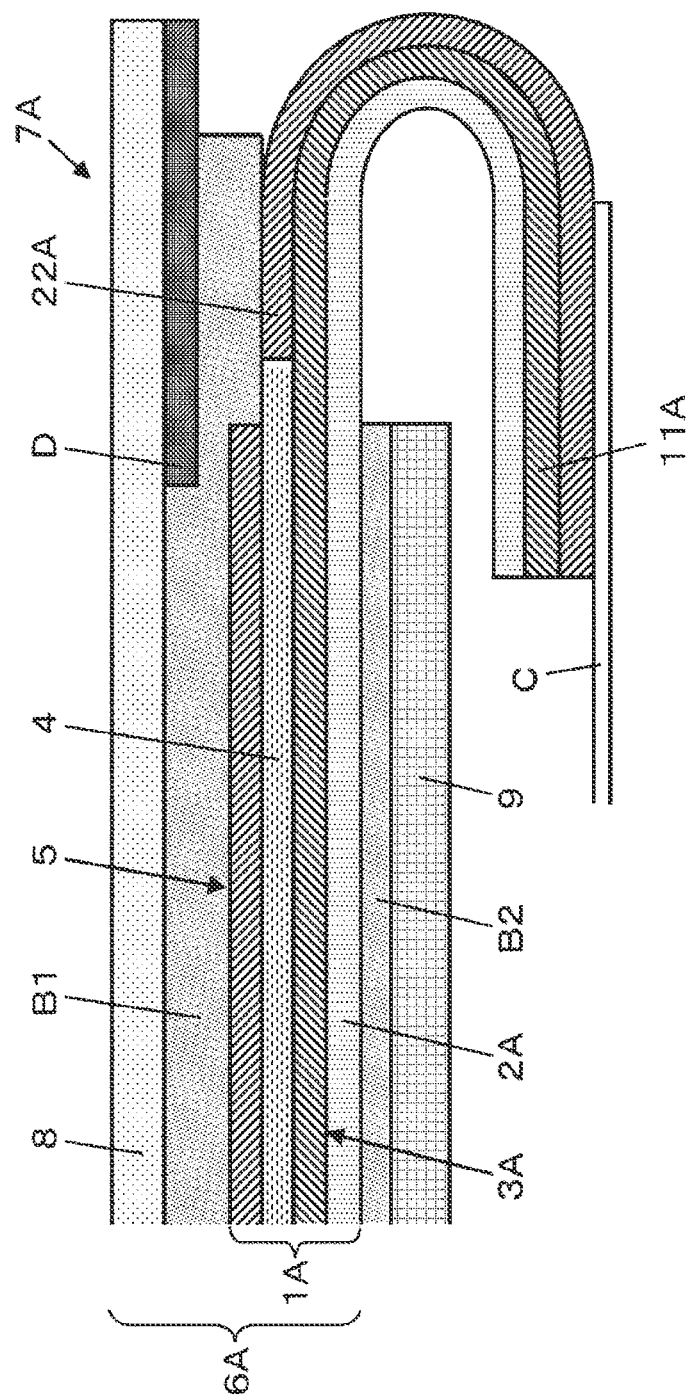
FIG. 6 is a partial cross-sectional view illustrating another example of the touch panel display device according to Embodiment 1.

In the touch panel display device 7 illustrated in FIG. 4, the flexible circuit board C connected to the first connection terminal portion 22 and the second connection terminal portion 25 is folded back so as to face the surface of the display module 9 on the side opposite to the display surface. However, for example, as illustrated in FIG. 6, a laminated body consisting of a flexible substrate 2A, an anchor electrode portion 11A, and a first connection terminal portion 22A may be folded back so as to face the surface of the display module 9 on the side opposite to the display surface, and the flexible circuit substrate C may be connected to the first connection terminal portion 22A and the second connection terminal portion 25 at an end portion of the laminated body. Similarly to the anchor electrode portion 11 illustrated in FIG. 3, the anchor electrode portion 11A is set such that the total value Y1 of the lengths of the components parallel to the Y direction of the contour lines of the anchor electrode portion 11A is equal to or more than the total value X1 of the lengths of the components parallel to the X direction of the contour lines of the anchor electrode portion 11A.

In this case, although a stress acts on the interface between the first connection terminal portion 22A and the anchor electrode portion 11A due to the folding of the laminated body consisting of the flexible substrate 2A, the anchor electrode portion 11A, and the first connection terminal portion 22A, the total value Y1 of the lengths of the components parallel to the Y direction of the contour lines of the anchor electrode portion 11A is equal to or more than the total value X1 of the lengths of the components parallel to the X direction of the contour lines of the anchor electrode portion 11A. Accordingly, this can resist the stress, and peeling between the first connection terminal portion 22A and the anchor electrode portion 11A can be suppressed.

Hereinafter, respective members constituting the conductive member 1 for a touch panel and the touch panel 6 according to Embodiment 1 will be described. Respective members constituting a conductive member for a touch panel according to Embodiment 2 (described later) are similar to the respective members constituting the conductive member 1 for a touch panel according to Embodiment 1.

Flexible Substrate

The flexible substrate 2 is not particularly limited as long as it is transparent, has electrical insulating properties, and has flexibility, and for example, a resin substrate or the like is used. More specifically, as the material constituting the flexible substrate 2, for example, polyethylene terephthalate (PET), polyethylene naphthalate (PEN), cyclo-olefine polymer (COP), cyclic olefin copolymer (COC), polycarbonate (PC), acrylic resin, polyethylene (PE), polypropylene (PP), polystyrene (PS), polyvinyl chloride (PVC), polyvinylidene chloride (PVDC), cellulose triacetate (TAC), or the like, can be used. The thickness of the flexible substrate 2 is, for example, preferably 20 μm to 1100 μm, and more preferably 20 μm to 500 μm. In particular, in the case of an organic resin substrate such as PET, the thickness is preferably μm to 200 μm, and more preferably 30 μm to 100 μm.

The total luminous transmittance of the flexible substrate 2 is preferably 40% to 100%. The total luminous transmittance is measured by using, for example, "Plastics-Determination of total luminous transmittance and reflectance-" prescribed in JIS K 7375:2008.

One preferred embodiment of the flexible substrate 2 is a treated substrate that has been subjected to at least one treatment selected from the group consisting of atmospheric pressure plasma treatment, corona discharge treatment, and ultraviolet irradiation treatment. By performing the above-described treatment, a hydrophilic group such as an OH group is introduced into a surface of the treated flexible substrate 2, and adhesiveness between the flexible substrate 2 and the first conductive layer 3 is improved. Also, among the above-described treatment, the atmospheric pressure plasma treatment is preferable in that the adhesiveness between the flexible substrate 2 and the first conductive layer 3 is further improved.

First Conductive Layer and Second Conductive Layer

The first conductive layer 3 and the second conductive layer 5 are formed of a metal or an alloy as a forming material, and can be formed of, for example, silver, copper, gold, aluminum, nickel, chromium, molybdenum, or tungsten. The first conductive layer 3 and the second conductive layer 5 preferably include copper, but may include a metal other than copper, such as gold or silver. Also, the first conductive layer 3 and the second conductive layer 5 may contain metal silver and gelatin or a polymer binder, such as acrylic latex or styrene latex, which are suitable for forming a mesh pattern. Other preferred examples are metals, such as aluminum, silver, molybdenum, and titanium, and an alloy thereof. Further, a laminated structure of the above-described materials may be used. For example, a thin metal wire having a laminated structure of molybdenum/copper/molybdenum, molybdenum/aluminum/molybdenum, or the like, can be used.

Further, the first conductive layer 3 and the second conductive layer 5 may include, for example, metal-oxide particles; a metal paste, such as a silver paste or a copper paste; or metal nanowire particles, such as silver nanowires or copper nanowires. The first conductive layer and the second conductive layer are preferably formed of the same metal material.

Next, a method of forming the first conductive layer 3 and the second conductive layer 5 will be described. As a method of forming these, for example, a sputtering process, a plating process, a silver halide process, a printing process, or the like, can be appropriately used.

A method of forming the first conductive layer 3 and the second conductive layer 5 by the sputtering process will be described. The first conductive layer 3 and the second conductive layer 5 can be formed by first forming a copper foil layer by sputtering, and forming copper wires from the copper foil layer by a photolithography process. The copper foil layer may be formed by so-called vapor deposition instead of sputtering. As the copper foil layer, an electrolytic copper foil can be used other than a sputtered copper foil or a vapor-deposited copper foil. More specifically, a process of forming copper wires described in JP2014-29614A can be used.

A method of forming the first conductive layer 3 and the second conductive layer 5 by the plating process will be described. For example, the first conductive layer 3 and the second conductive layer 5 can be constituted using a metal plating film that is formed on an electroless plating underlayer by performing electroless plating on the underlayer. In this case, the first conductive layer 3 and the second conductive layer 5 are formed by forming a catalytic ink containing at least metal fine particles in a pattern on a substrate, and then immersing the substrate in an electroless plating bath to form a metal plating film. More specifically, a method of producing a metal coated substrate described in JP2014-159620A can be used.

Also, the first conductive layer 3 and the second conductive layer 5 are formed by forming a resin composition having at least a functional group capable of interacting with a metal catalytic precursor in a pattern on a substrate, then applying a catalyst or a catalytic precursor, and immersing the substrate in an electroless plating bath to form a metal plating film. More specifically, a method of producing a metal coated substrate described in JP2012-144761A can be applied.

A method of forming the first conductive layer 3 and the second conductive layer 5 by the silver halide process will be described. The first conductive layer 3 and the second conductive layer 5 can be formed by first performing exposure processing of exposing a silver halide emulsion layer including silver halide to light using exposure patterns for forming the first conductive layer 3 and the second conductive layer 5, and then performing development processing on the exposed silver halide emulsion layer. More specifically, methods of producing thin metal wires described in JP2012-6377A, JP2014-112512A, JP2014-209332A, JP2015-22397A, JP2016-192200A, and WO2016/157585A can be used.

A method of forming the first conductive layer 3 and the second conductive layer 5 by the printing process will be described. The first conductive layer 3 and the second conductive layer 5 can be formed by first applying a conductive paste containing a conductive powder to a substrate so as to have the same patterns as the first conductive layer 3 and the second conductive layer 5, and then performing heat processing. The pattern formation using the conductive paste is performed by, for example, an inkjet process or a screen printing process. More specifically, a conductive paste described in JP2011-28985A can be used as the conductive paste.

Cover Member

As the material of the cover member 8, tempered glass, polycarbonate, polyethylene terephthalate, polymethyl methacrylate (PMMA), or the like, can be used, and the thickness of the cover member 8 is preferably 0.1 mm to 1.5 mm.

Pressure Sensitive Adhesive

As the pressure sensitive adhesive B1 for bonding the conductive member 1 for a touch panel and the cover member 8 to each other and the pressure sensitive adhesive B2 for bonding the conductive member 1 for a touch panel and the display module 9 to each other, an optical clear adhesive (OCA) sheet or optical clear resin (OCR) can be used, and a preferable film thickness is 10 μm or more and 200 μm or less. As the optical clear adhesive sheet, for example, 8146 series manufactured by 3M Company can be used.

Embodiment 2

Figure 8:
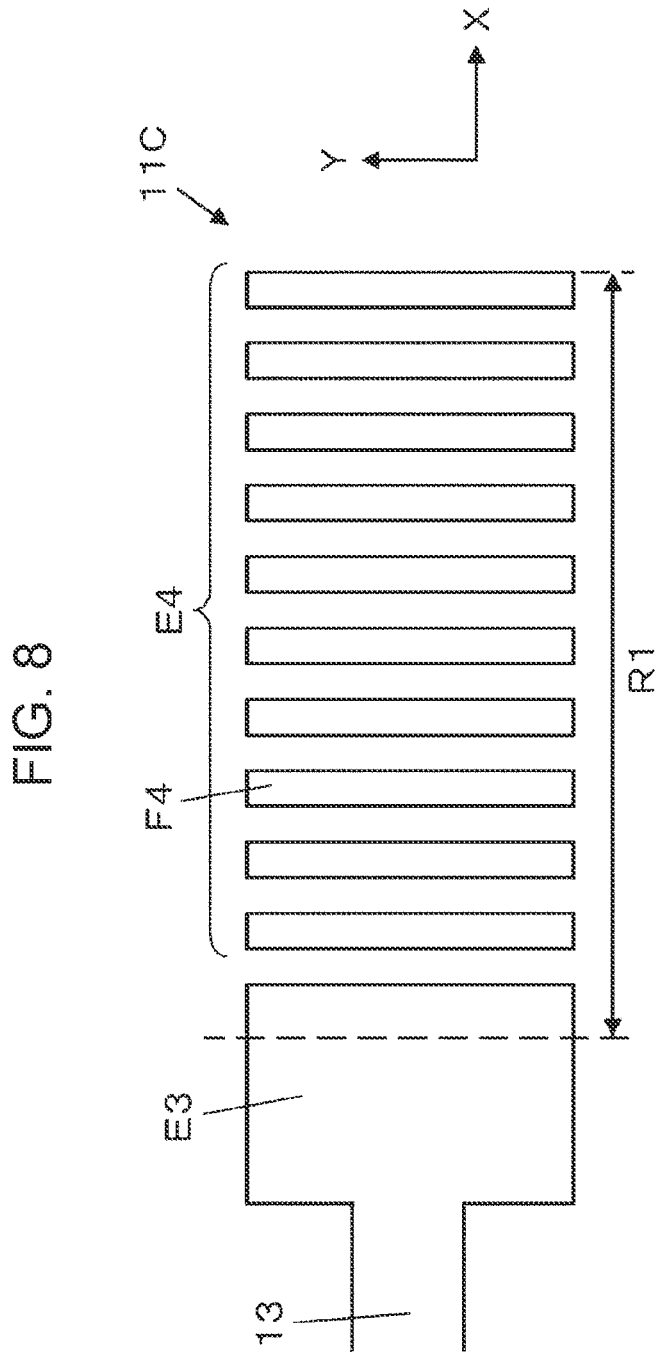
FIG. 8 is a view illustrating an anchor electrode portion according to Embodiment 2.

FIG. 8 illustrates an anchor electrode portion 11C according to Embodiment 2.

The anchor electrode portion 11C has a quadrangular connection anchor portion E3 electrically connected to the first lead wiring portion 13, and an independent anchor portion E4 disposed at an interval from the connection anchor portion E3 in the X direction. Also, the anchor electrode portion 11C has an exposed region R1 not covered with the insulating layer 4, and at least a part of the connection anchor portion E3 and the independent anchor portion E4 are disposed in the exposed region R1.

The independent anchor portion E4 has a plurality of unit anchor portions F4 arranged at an interval in the X direction, and each unit anchor portion F4 has a rectangular shape having a long side along the Y direction and a short side along the X direction.

The first connection terminal portion 22 of the second conductive layer 5 is formed on the anchor electrode portion 11C and on the flexible substrate 2 so as to be electrically connected to the connection anchor portion E3 and the independent anchor portion E4.

When the flexible circuit board connected to the first connection terminal portion 22 and the second connection terminal portion 25 is folded back as illustrated in FIG. 4, or when the laminated body consisting of the flexible substrate 2A, the anchor electrode portion 11A, and the first connection terminal portion 22A is folded back as illustrated in FIG. 6, a stress acts on the interface between the anchor electrode portion 11C and the first connection terminal portion 22. However, since the anchor electrode portion 11C has the independent anchor portion E4 disposed at an interval from the connection anchor portion E3 in the X direction and consisting of the plurality of unit anchor portions F4, the stress is not concentrated but dispersed by the independent anchor portion E4. Accordingly, peeling between the first connection terminal portion 22 and the anchor electrode portion 11C can be suppressed.

Thus, even in the conductive member for a touch panel according to Embodiment 2 in which the anchor electrode portion 11C has the independent anchor portion E4, peeling between the first connection terminal portion 22 and the anchor electrode portion 11C can be suppressed, similarly to the conductive member 1 for a touch panel according to Embodiment 1.

Although the independent anchor portion E4 has the plurality of unit anchor portions F4 in the anchor electrode portion 11C illustrated in FIG. 8, even in a case where the independent anchor portion E4 has only one unit anchor portion F4, the stress acting on the anchor electrode portion 11C and the first connection terminal portion 22 is dispersed, and peeling between the anchor electrode portion 11C and the first connection terminal portion 22 can be suppressed. However, from the viewpoint of dispersing the stress and stably fixing the first connection terminal portion 22, the independent anchor portion E4 preferably has two or more unit anchor portions F4.

Also, the shape of the anchor electrode portion 11C is not particularly limited to the shape illustrated in FIG. 8.

Figure 9:
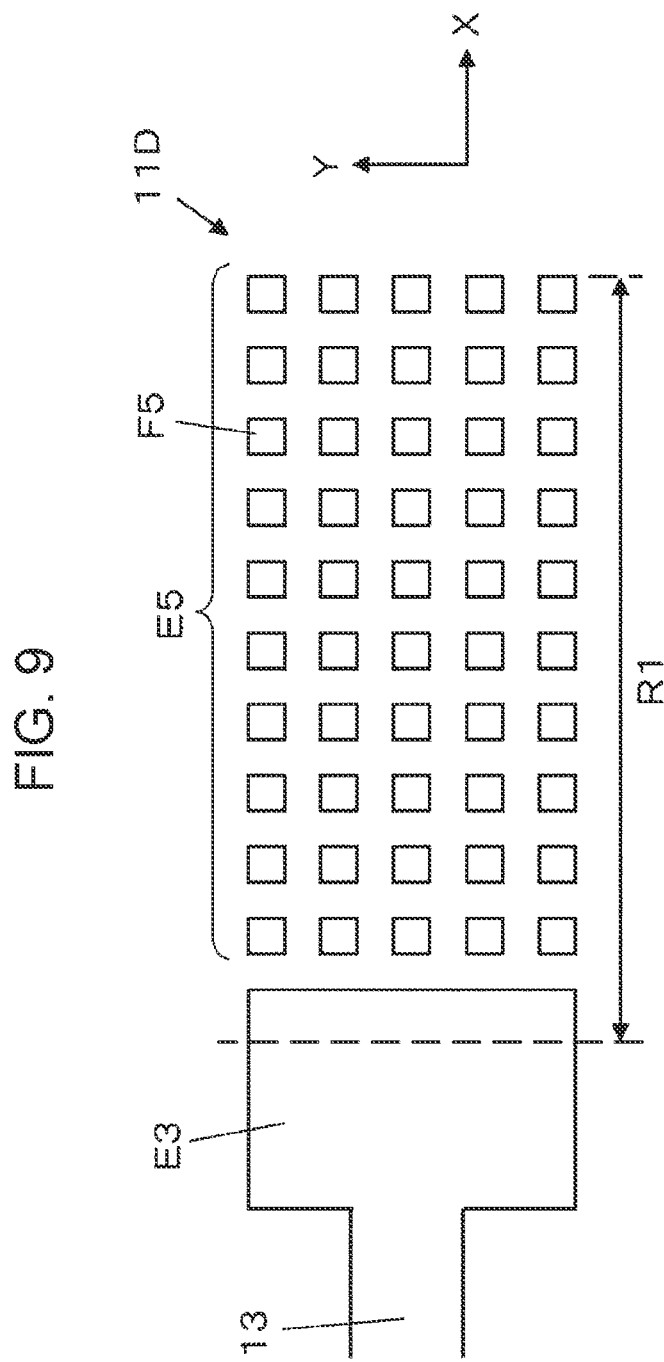
FIG. 9 is a view illustrating a first modification of the anchor electrode portion according to Embodiment 2.

For example, as illustrated in FIG. 9, an anchor electrode portion 11D may have an independent anchor portion E5 in which a plurality of quadrangular unit anchor portions F5 are arranged in the X direction and the Y direction. Even in the anchor electrode portion 11D, at least a part of the connection anchor portion E3 and the independent anchor portion E5 are disposed in the exposed region R1.

The shape of each unit anchor portion F5 is not limited to a quadrangle, and may be designed to be any shape such as a rhombus shape, a circular shape, or a polygonal shape.

Figure 10:
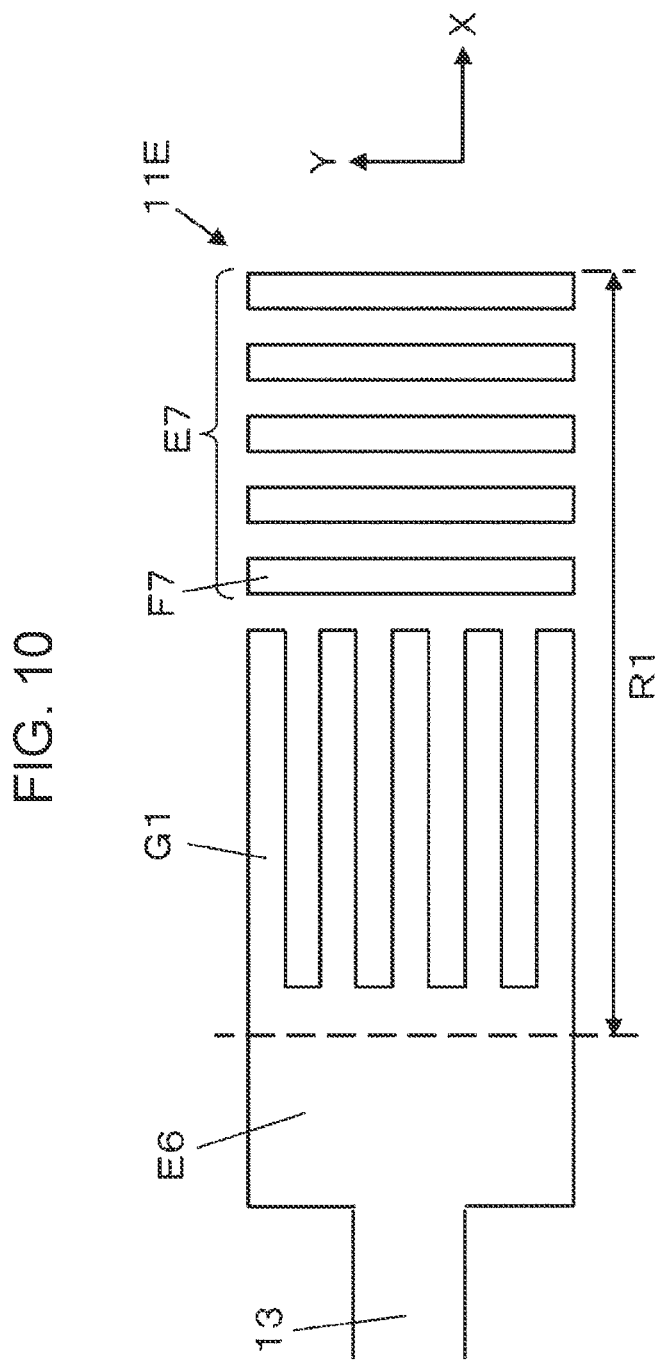
FIG. 10 is a view illustrating a second modification of the anchor electrode portion according to Embodiment 2.

Further, for example, an anchor electrode portion 11E illustrated in FIG. 10 has a connection anchor portion E6 coupled to one end of each of a plurality of rectangular portions G1 each having a long side along the X direction and a short side along the Y direction and arranged in the Y direction, and an independent anchor portion E7. The independent anchor portion E7 has a plurality of unit anchor portions F7 each having a rectangular shape having a long side along the Y direction and a short side along the X direction and arranged in the X direction. Even in the anchor electrode portion 11E, at least a part of the connection anchor portion E6 and the independent anchor portion E7 are disposed in the exposed region R1.

Further, for example, an anchor electrode portion 11F illustrated in FIG. 11 has a substantially quadrangular connection anchor portion E8 and an independent anchor portion E9, and the independent anchor portion E9 has a plurality of rectangular unit anchor portions F9 each having a long side along the X direction and a short side along the Y direction. Even in the anchor electrode portion 11F, at least a part of the connection anchor portion E8 and the independent anchor portion E9 are disposed in the exposed region R1. In the independent anchor portion E9, the plurality of unit anchor portions F9 are disposed so as to be shifted in a staggered manner in the Y direction.

Thus, even in any of the cases where the anchor electrode portions 11D, 11E, and 11F have the shapes illustrated in FIGS. 9 to 11, the stresses acting on the anchor electrode portion 11D, 11E, or 11F and the first connection terminal portion 22 can be relaxed, and peeling between the anchor electrode portion 11D, 11E, or 11F and the first connection terminal portion 22 can be suppressed.

The conductive member for a touch panel according to Embodiment 2 may have a configuration similar to that of the conductive member for a touch panel according to Embodiment 1 except for the above-described anchor electrode portions.

A method of producing the conductive member 1 for a touch panel according to Embodiment 1 of the present invention will be described.

First, the flexible substrate 2 is prepared, and the first detection electrode portion 12, the first lead wiring portion 13, and the anchor electrode portion 11 are patterned on the flexible substrate 2 to form the first conductive layer 3.

Figure 5:
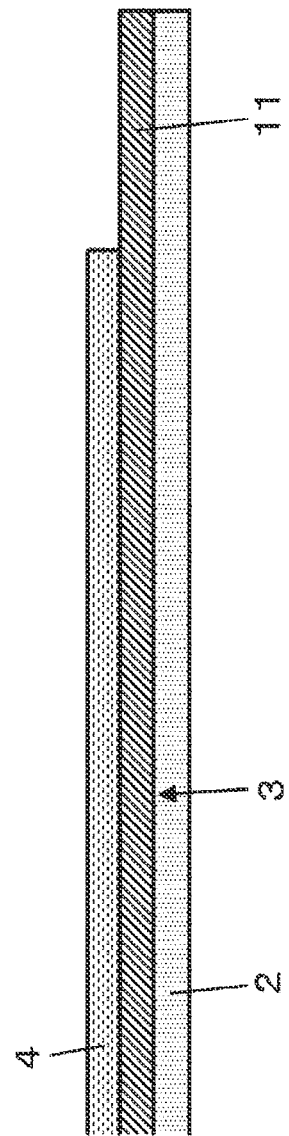
FIG. 5 is a view illustrating a state in which the conductive member for a touch panel according to Embodiment 1 is being produced.

Next, as illustrated in FIG. 5, the insulating layer 4 is formed on the first conductive layer 3 by patterning the insulating layer 4 such that the exposed region R1 of the anchor electrode portion 11 is exposed.

Further, the second conductive layer main body 21 consisting of the second detection electrode portion 23, the second lead wiring portion 24, and the second connection terminal portion 25 is patterned on the insulating layer 4, and at the same time, the first connection terminal portion 22 is patterned so as to cover the anchor electrode portion 11 and so as to be disposed at an interval from the second conductive layer main body 21 to form the second conductive layer 5.

In this way, the conductive member 1 for a touch panel is produced.

Since the anchor electrode portion 11 is covered with the first connection terminal portion 22, the risk of being damaged in the producing process of the conductive member 1 for a touch panel is reduced. Also, since the second conductive layer main body 21 and the first connection terminal portion 22 are formed at the same time, the conductive member 1 for a touch panel can be produced with a small number of steps.

The method of producing the conductive member for a touch panel according to Embodiment 2 is similar to the method of producing the conductive member 1 for a touch panel according to Embodiment 1.

REFERENCE SIGNS LIST 1, 1A conductive member for touch panel
2, 2A flexible substrate
3, 3A first conductive layer
4 insulating layer
5 second conductive layer
6, 6A touch panel
7, 7A touch panel display device
8 cover member
9 display module
11, 11A, 11B, 11C, 11D, 11E, 11F anchor electrode portion
12 first detection electrode portion
13 first lead wiring portion
21 second conductive layer main body
22, 22A first connection terminal portion
23 second detection electrode portion
24 second lead wiring portion
25 second connection terminal portion
A1, A2 opening portion
B1, B2 pressure sensitive adhesive
C flexible circuit board
D decorative print portion
E1 mesh shape portion
E2, G1 rectangular portion
E3, E6, E8 connection anchor portion
E4, E5, E7 independent anchor portion
F4, F5, F7, F9 unit anchor portion
M1 first thin metal wire
M2 second thin metal wire
R1 exposed region
S1 visual recognition region
S2 peripheral wiring region
S3 connection wiring region

What is claimed is:

1. A conductive member for a touch panel, comprising:
a flexible substrate;
a first conductive layer disposed on one surface of the flexible substrate;
an insulating layer disposed on the first conductive layer; and
a second conductive layer disposed on the insulating layer and on the first conductive layer,
wherein, in plan view, the flexible substrate has a visual recognition region, a peripheral wiring region located on an outer side of the visual recognition region, and a connection wiring region located on an outer side of the peripheral wiring region in a predetermined direction,
wherein the first conductive layer has
a first detection electrode portion disposed in the visual recognition region,
a first lead wiring portion disposed in the peripheral wiring region and electrically connected to the first detection electrode portion, and
an anchor electrode portion disposed in the connection wiring region and electrically connected to the first lead wiring portion,
wherein the second conductive layer has
a second detection electrode portion disposed in the visual recognition region,
a second lead wiring portion disposed in the peripheral wiring region and electrically connected to the second detection electrode portion, a second connection terminal portion disposed in the connection wiring region
and electrically connected to the second lead wiring portion, and
a first connection terminal portion disposed in the connection wiring region, electrically insulated from the second lead wiring portion, covering the anchor electrode portion, and electrically connected to the anchor electrode portion,
wherein, in plan view, the anchor electrode portion forms a shape pattern in which the surface of the flexible substrate is partially exposed, and has an exposed region having at least a part not covered with the insulating layer, wherein the first connection terminal portion covers the anchor electrode portion and is electrically connected to the anchor electrode portion in the exposed region, and wherein contour lines of the shape pattern of a portion of the anchor electrode portion covered with the first connection terminal portion are set such that a total value Y1 of lengths of components orthogonal to the predetermined direction is equal to or more than a total value X1 of lengths of components parallel to the predetermined direction.

2. The conductive member for a touch panel according to claim 1, wherein, in plan view, a ratio of an area of the anchor electrode portion in the exposed region to an area of the first connection terminal portion in the exposed region is 50% or less.

3. The conductive member for a touch panel according to claim 1, wherein the first conductive layer and the second conductive layer are formed of a same metal material.

4. The conductive member for a touch panel according to claim 2, wherein the first conductive layer and the second conductive layer are formed of a same metal material.

5. A touch panel comprising:
the conductive member for a touch panel according to claim 1;
a circuit board electrically connected to the first connection terminal portion and the second connection terminal portion; and
a cover member disposed on the second conductive layer via a pressure sensitive adhesive.

6. A touch panel comprising:
the conductive member for a touch panel according to claim 2;
a circuit board electrically connected to the first connection terminal portion and the second connection terminal portion; and
a cover member disposed on the second conductive layer via a pressure sensitive adhesive.

7. A touch panel display device comprising:
the touch panel according to claim 5; and
a display module comprising a display surface, the display surface being bonded onto another surface of the flexible substrate via a pressure sensitive adhesive.

8. The touch panel display device according to claim 7, wherein the circuit board has one end to which the first connection terminal portion and the second connection terminal portion are connected, and another end folded back so as to face a surface of the display module on a side opposite to the display surface.

9. The touch panel display device according to claim 7, wherein the connection wiring region has an end portion folded back so as to face a surface of the display module on a side opposite to the display surface.

10. A method of producing the conductive member for a touch panel according to claim 1, the method comprising:
a first step of forming a first conductive layer on one surface of a flexible substrate;
a second step of forming an insulating layer on the first conductive layer; and
a third step of forming a second conductive layer on the insulating layer and on the first conductive layer,
wherein in plan view, the flexible substrate has a visual recognition region, a peripheral wiring region located on an outer side of the visual recognition region, and a connection wiring region located on an outer side of the peripheral wiring region in a predetermined direction,
wherein the first conductive layer has a first detection electrode portion disposed in the visual recognition region,
a first lead wiring portion disposed in the peripheral wiring region and electrically connected to the first detection electrode portion, and
an anchor electrode portion disposed in the connection wiring region and electrically connected to the first lead wiring portion,
wherein the second conductive layer has
a second detection electrode portion disposed in the visual recognition region,
a second lead wiring portion disposed in the peripheral wiring region and electrically connected to the second detection electrode portion,
a second connection terminal portion disposed in the connection wiring region and electrically connected to the second lead wiring portion, and
a first connection terminal portion disposed in the connection wiring region, electrically insulated from the second lead wiring portion, covering the anchor electrode portion, and electrically connected to the anchor electrode portion,
wherein, in plan view, the anchor electrode portion forms a shape pattern in which the surface of the flexible substrate is partially exposed, and has an exposed region having at least a part not covered with the insulating layer,
wherein the first connection terminal portion covers the anchor electrode portion and is electrically connected to the anchor electrode portion in the exposed region, and
wherein contour lines of the shape pattern of a portion of the anchor electrode portion covered with the first connection terminal portion are set such that a total value Y1 of lengths of components orthogonal to the predetermined direction is equal to or more than a total value X1 of lengths of components parallel to the predetermined direction.

11. A conductive member for a touch panel, comprising:
a flexible substrate;
a first conductive layer disposed on one surface of the flexible substrate;
an insulating layer disposed on the first conductive layer; and
a second conductive layer disposed on the insulating layer and on the first conductive layer,
wherein, in plan view, the flexible substrate has a visual recognition region, a peripheral wiring region located on an outer side of the visual recognition region, and a connection wiring region located on an outer side of the peripheral wiring region in a predetermined direction,
wherein the first conductive layer has
a first detection electrode portion disposed in the visual recognition region,
a first lead wiring portion disposed in the peripheral wiring region and electrically connected to the first detection electrode portion, and
an anchor electrode portion disposed in the connection wiring region and having at least a part electrically connected to the first lead wiring portion,
wherein the second conductive layer has
a second detection electrode portion disposed in the visual recognition region,
a second lead wiring portion disposed in the peripheral wiring region and electrically connected to the second detection electrode portion, a second connection terminal portion disposed in the connection wiring region and electrically connected to the second lead wiring portion, and a first connection terminal portion disposed in the connection wiring region, electrically insulated from the second lead wiring portion, covering the anchor electrode portion, and electrically connected to the anchor electrode portion, wherein the anchor electrode portion includes a connection anchor portion connected to the first lead wiring portion and an independent anchor portion disposed at an interval from the connection anchor portion in the predetermined direction, and has an exposed region in which at least a part of the connection anchor portion and the independent anchor portion are not covered with the insulating layer, and wherein the first connection terminal portion covers the anchor electrode portion and is electrically connected to the anchor electrode portion in the exposed region.

12. The conductive member for a touch panel according to claim 11, wherein the independent anchor portion has a plurality of unit anchor portions disposed at an interval.

13. The conductive member for a touch panel according to claim 11, wherein, in plan view, a ratio of an area of the anchor electrode portion in the exposed region to an area of the first connection terminal portion in the exposed region is 50% or less.

14. The conductive member for a touch panel according to claim 12, wherein, in plan view, a ratio of an area of the anchor electrode portion in the exposed region to an area of the first connection terminal portion in the exposed region is 50% or less.

15. The conductive member for a touch panel according to claim 11, wherein the first conductive layer and the second conductive layer are formed of a same metal material.

16. The conductive member for a touch panel according to claim 12, wherein the first conductive layer and the second conductive layer are formed of a same metal material.

17. A touch panel comprising:
the conductive member for a touch panel according to claim 11;
a circuit board electrically connected to the first connection terminal portion and the second connection terminal portion; and
a cover member disposed on the second conductive layer via a pressure sensitive adhesive.

18. A touch panel comprising:
the conductive member for a touch panel according to claim 12;
a circuit board electrically connected to the first connection terminal portion and the second connection terminal portion; and
a cover member disposed on the second conductive layer via a pressure sensitive adhesive.

19. A touch panel comprising:
the conductive member for a touch panel according to claim 13;
a circuit board electrically connected to the first connection terminal portion and the second connection terminal portion; and
a cover member disposed on the second conductive layer via a pressure sensitive adhesive.

20. A method of producing the conductive member for a touch panel according to claim 11, the method comprising:
a first step of forming a first conductive layer on one surface of a flexible substrate;
a second step of forming an insulating layer on the first conductive layer; and
a third step of forming a second conductive layer on the insulating layer and on the first conductive layer, wherein in plan view, the flexible substrate has a visual recognition region, a peripheral wiring region located on an outer side of the visual recognition region, and a connection wiring region located on an outer side of the peripheral wiring region in a predetermined direction, wherein the first conductive layer has
a first detection electrode portion disposed in the visual recognition region,
a first lead wiring portion disposed in the peripheral wiring region and electrically connected to the first detection electrode portion, and
an anchor electrode portion disposed in the connection wiring region and having at least a part electrically connected to the first lead wiring portion, wherein the second conductive layer has
a second detection electrode portion disposed in the visual recognition region,
a second lead wiring portion disposed in the peripheral wiring region and electrically connected to the second detection electrode portion,
a second connection terminal portion disposed in the connection wiring region and electrically connected to the second lead wiring portion, and
a first connection terminal portion disposed in the connection wiring region, electrically insulated from the second lead wiring portion, covering the anchor electrode portion, and electrically connected to the anchor electrode portion, wherein the anchor electrode portion includes a connection anchor portion connected to the first lead wiring portion and an independent anchor portion disposed at an interval from the connection anchor portion in the predetermined direction, and has an exposed region in which at least a part of the connection anchor portion and the independent anchor portion are not covered with the insulating layer, and wherein the first connection terminal portion covers the anchor electrode portion and is electrically connected to the anchor electrode portion in the exposed region.

* * * * *